United States Patent Office 3,780,054
Patented Dec. 18, 1973

3,780,054
TRIAZOLINE 4-PHOSPHATES
John L. Miesel, Indianapolis, Ind., assignor to Eli Lilly and Company, Indianapolis, Ind.
No Drawing. Filed July 19, 1972, Ser. No. 273,248
Int. Cl. A01n 9/36; C07f 9/08
U.S. Cl. 260—308 C                    6 Claims

ABSTRACT OF THE DISCLOSURE

A class of novel 5-oxo(thioxo)-3-fluoroalkyl-1-substituted-$\Delta^2$-1,2,4-triazolin-4-yl vinyl phosphates have insecticidal and acaricidal utility.

BACKGROUND OF THE INVENTION

Organic chemists have been active for many years in research directed toward the synthesis and development of new insecticides and acaricides. It has been known for years that organic chemical insecticides are very valuable to man. Organic chemical insecticides, which have been synthesized in chemical research programs, are useful in increasing crop yields, in increasing yields of the products of animal culture, and in killing insects and acarids which are directly harmful to man.

Despite the high degree of perfection to which the organic chemical insecticide art has been brought, many problems remain to be solved by new and better insecticides. For example, after a typical insecticide has been used for a period of time, the insects and acarids which have been exposed to it develop resistance. That is, those individuals which are exposed but are not killed by the insecticide tend to produce young which will also be uninjured by the insecticide. Over a period of many generations, the inherited trait of resistance to that insecticide becomes very strong. Further, no insecticide is so perfect that it could not be beneficially replaced by new insecticides of higher activity, higher selectivity, or less hazard to man, to crop plants, or to animals.

Therefore, those individuals and organizations engaged in research in organic chemical insecticides continue to search for newer and better compounds. A particularly productive field of chemistry in which new insecticides continue to be found is the field of organic phosphates. For example, useful additions to the phosphate insecticide art were made by the following chemical researchers.

Belgian Pat. 741,142 disclosed phosphate derivatives wherein the phosphate moiety is linked to a pyrazole or benzopyrazole ring through a vinyl or substituted-vinyl group.

Netherlands Pat. 7018254 taught a class of phosphates wherein the phosphate moiety is linked to a chloro-substituted benzene ring through a bromovinyl group.

Netherlands Pat. 7013728 taught a class of vinyl phosphate derivatives of a number of heterocyclic rings containing sulfur, oxygen, or nitrogen.

Japanese Pat. 14,478/71 disclosed phosphates, said to have insecticidal and herbicidal activity, wherein the phosphate moiety is linked through a dichlorovinyl group to a dichlorobenzene ring.

Cebalo, West German Auslegeschrift 2,029,375, and Timmler, U.S. Pat. 3,594,390, disclosed the insecticidal utility and the methods of preparation of 5-thioxo-$\Delta^2$-1,2,4-triazoline phosphorus derivatives.

British Pat. 713,278 disclosed insecticidal activity of phosphorus derivatives of a very wide range of heterocyclic ring compounds containing oxo or thioxo groups.

My invention disclosed in this specification and claims deals, as do the above references, with phosphorus derivatives of a hetero ring compound. However, it will be clear to those skilled in the organic chemical art, and especially to those skilled in the phosphate field of the organic chemical insecticide art, that the present invention is distinct from all earlier work.

SUMMARY

I have now discovered a class of novel 5-oxo(thioxo)-3-fluoroalkyl-1-substituted-$\Delta^2$-1,2,4-triazolin - 4 - yl vinyl phosphates which are useful insecticides and acaricides. I have also invented insecticidal and acaricidal compositions which comprise my new triazoline compounds, and insecticidal and acaricidal methods which make use of those compounds.

DESCRIPTION OF THE PREFERRED EMBODIMENT

My new triazoline phosphates are of the formula $$\begin{array}{c} F\quad N\!\!-\!\!-\!\!-\!\!-\!\!N\!\!-\!\!R^4 \\ \phantom{F}|\phantom{xx}\| \phantom{xxxx}| \\ F\!\!-\!\!C\!\!-\!\!C \phantom{xx} C\!\!=\!\!X \\ \phantom{F\!\!-\!\!}|\phantom{xx}\diagdown\!\!\diagup \\ \phantom{F\!\!-\!\!}R^3 \phantom{xx} N \phantom{xx} O\phantom{x}O\!\!-\!\!R^5 \\ \phantom{xxxxxxxx}|\phantom{xx}\|\diagup \\ \phantom{xxxxxxxx}C\!\!-\!\!O\!\!-\!\!P \\ \phantom{xxxxxxx}\|\phantom{xxxx}\diagdown \\ \phantom{xxxx}R^1\!\!-\!\!C\!\!-\!\!R^2\phantom{xx}O\!\!-\!\!R^5 \end{array}$$

wherein

X represents
  (A) oxygen, or
  (B) sulfur;
$R^1$ and $R^2$ independently represent
  (A) chloro,
  (B) bromo,
  (C) $C_1$–$C_2$ alkyl, or
  (D) hydrogen;
$R^3$ represents
  (A) hydrogen,
  (B) fluoro,
  (C) chloro,
  (D) trifluoromethyl, or
  (E) difluoromethyl;
$R^4$ represents
  (A) $C_1$–$C_4$ alkyl,
  (B) $C_3$–$C_8$ cycloalkyl, or
  (C) $C_3$–$C_4$ alkenyl;
$R^5$ represents $C_1$–$C_4$ alkyl.

In the above generic formula, the general chemical terms bear their usual meanings in the organic chemical art. Examples of the groups which are referred to by the general terms will be given in order to assure that the formula is understood by those skilled in the art.

The terms $C_1$–$C_2$ alkyl, $C_1$–$C_4$ alkyl, $C_3$–$C_8$ cycloalkyl, and $C_3$–$C_4$ alkenyl refer to chemical groups such as methyl, ethyl, isopropyl, butyl, s-butyl, allyl, cyclopropyl, cyclohexyl, and crotyl.

The two groups identified as $R^5$ are identical in each instance.

The following compounds, which are exemplary but not exhaustive of my new triazoline phosphates, are named in order to make the scope of my invention more clear.

[2-bromo-2-chloro-1-(3-difluoromethyl-1-methyl-5-oxo-$\Delta^2$-1,2,4-triazolin-4-yl)vinyl]dipropyl phosphate
[2-bromo-1-(1-isopropyl-5-thioxo-3-trifluoromethyl-$\Delta^2$-1,2,4-triazolin-4-yl)vinyl]diisopropyl phosphate
dibutyl[1-(1-s-butyl-3-difluoromethyl-5-oxo $\Delta^2$-1,2,4-triazolin-4-yl)-2-chloropropenyl]phosphate
dimethyl[1-(1-propyl-5-thioxo-3-trifluoromethyl-$\Delta^2$-1,2,4-triazolin-4-yl)-1-butenyl]phosphate
diethyl[1-[1-allyl-3-(1,1,2,2-tetrafluoroethyl)-5-thioxo-$\Delta^2$-1,2,4-triazolin-4-yl]vinyl]phosphate
[1-(1-crotyl-3-pentafluoroethyl-5-thioxo-$\Delta^2$-1,2,4-triazolin-4-yl)vinyl]dimethyl phosphate

[1-(1-ethyl-3-chlorodifluoromethyl-5-oxo-Δ²-1,2,4-triazolin-4-yl)vinyl]dipropyl phosphate
diethyl[1-(1-cyclopropyl-5-oxo-3-trifluoromethyl-Δ²-1,2,4-triazolin-4-yl)vinyl]phosphate
[2-chloro-1-(1-cyclopentyl-3-difluoromethyl-5-thioxo-Δ²-1,2,4-triazolin-4-yl)propenyl]dimethyl phosphate
[1-(3-chlorodifluoromethyl-1-cycloheptyl-5-oxo-Δ²-1,2,4-triazolin-4-yl)-1-butenyl]dipropyl phosphate
di-s-butyl[1-(3-difluoromethyl-5-oxo-1-allyl-Δ²-1,2,4-triazolin-4-yl)-2-methyl-1-butenyl]phosphate
[2,2-dibromo-1-[1-(2-methallyl)-5-thioxo-3-trifluoromethyl-Δ²-1,2,4-triazolin-4-yl]vinyl]dimethyl phosphate
[1-[1-(2-butenyl)-3-difluoromethyl-5-oxo-Δ²-1,2,4-triazolin-4-yl]-2-methylpropenyl]di-t-butyl phosphate The following specific compounds are the preferred species of my invention.

[2-chloro-1-(1-methyl-5-thioxo-3-trifluoromethyl-Δ²-1,2,4-triazolin-4-yl)vinyl]diethyl phosphate
diethyl[1-(1-methyl-5-thioxo-3-trifluoromethyl-Δ²-1,2,4-triazolin-4-yl)vinyl]phosphate
diethyl[1-(1-methyl-5-thioxo-3-trifluoromethyl-Δ²-1,2,4-triazolin-4-yl)propenyl]phosphate
dimethyl[1-(1-methyl-5-thioxo-3-trifluoromethyl-Δ²-1,2,4-triazolin-4-yl)vinyl]phosphate
diethyl[1-(1-methyl-5-oxo-3-trifluoromethyl-Δ²-1,2,4-triazolin-4-yl)vinyl]phosphate I have also invention a superior and novel method of killing insects and acarids which comprises contacting the insect or acarid or the locus of the insect or acarid with an effective amount of one of the compounds described above. Further, I have invented insecticidal and acaricidal compositions which comprise an inert carrier and one of the novel compounds of the formula described above.

The most effective methods of contacting insects and acarids, or the locus of insects and acarids, and the most effective formulations of insecticidal and acaricidal compositions will be discussed below in this specification.

My novel triazoline phosphates are made by the following general methods of synthesis, which are methods known to the organic chemical art. The process in each instance comprises forming the triazoline ring, and then adding to the ring the appropriate vinyl phosphate moiety.

All of the compounds which are starting materials for my triazoline phosphates are either readily obtainable or can be made by methods which are well known to the organic chemical art.

Triazolin-5-thione rings are very conveniently made by the process of Cebalo, U.S. Pat. 3,625,951, which process is a ring closure of an appropriately 1,2-disubstituted thiosemicarbazide in basic aqueous solution.

Triazolin-5-one rings are made either by methylation of a triazolin-5-thione followed by oxidation with hydrogen peroxide, or by ring closure of an appropriately substituted semicarbazide by fusion.

The vinyl phosphate group is added to the 4-position of the triazoline ring in two steps without intermediate isolation. An intermediate is formed by reaction of the ring with an appropriately substituted acetic acid in the presence of dicyclohexylcarbodiimide, or by reaction of the ring compound with an appropriately substituted acetyl chloride in the presence of a base such as a tertiary amine. The dialkyl phosphate moiety is then added to the intermediate compound by reaction with a trialkyl phosphite at a temperature from ambient to 100° C.

The various reactions which are carried out in order to form my novel phosphate compounds may be designed by one skilled in the organic chemical art. The reactions are not unique. The following preparative examples are offered only in order to assure that all may obtain my novel compounds.

The first step in the synthesis of my compounds is the formation of the triazoline ring. The following simple method is effective for the synthesis of triazolin-5-thione rings.

Example 1.—1-methyl-3-trifluoromethyl-Δ²-1,2,4-triazolin-5-thione

A 6 g. portion of 2-methyl-1-trifluoroacetylthiosemicarbazide is added to 100 ml. of 2 percent aqueous KOH. The mixture is refluxed overnight. Then the mixture is cooled, acidified to pH 2, and concentrated under vacuum to remove the water. The residue after evaporation is dissolved in ethanol and filtered. The filtrate is concentrated to a solid under vacuum, and the product is recrystallized from hexane. The product is identified as 2.4 g. of 1-methyl-3-trifluoromethyl-Δ²-1,2,4-triazolin-5-thione, M.P. 118–120° C., by NMR analysis.

The above method is used, with minor alternations which can be readily supplied by one skilled in the organic chemical art, to make other triazolin-5-thiones. For example, the following compounds are made as above.

1-allyl-3-trifluoromethyl-Δ²-1,2,4-triazolin-5-thione
1-cyclobutyl-3-trifluoromethyl-Δ²-1,2,4-triazolin-5-thione
3-difluoromethyl-1-crotyl-Δ²-1,2,4-triazolin-5-thione
1-butyl-3-difluoromethyl-Δ²-1,2,4-triazolin-5-thione
1-cyclohexyl-3-pentafluoroethyl-Δ²-1,2,4-triazolin-5-thione The above synthesis is not effective to make my triazolin-5-one compounds. Such compounds are made by the processes illustrated in the following two examples.

Example 2.—1-methyl-3-trifluoromethyl-Δ²-1,2,4-triazolin-5-one

A solution is made of 2 g. of 1-methyl-3-trifluoromethyl-Δ²-1,2,4-triazolin-5-thione and 75 ml. of methanol. To the solution is added 500 mg. of NaOCH₃ and the mixture is stirred for 1 hour. Then 2.3 g. of methyl iodide is added, and the reaction mixture is stirred overnight at 50–60° C. The methanol is evaporated under vacuum and the residue is recrystallized from benzene-hexane. The product is found by NMR to be 1-methyl-3-trifluoromethyl-5-methylthio-1H-1,2,4-triazole.

A 2 g. portion of the above intermediate product is heated on the steam bath overnight with 25 ml. of acetic acid and 6 ml. of 30 percent H₂O₂. In the morning the reaction mixture is neutralized to pH 7, cooled, and extracted with ethyl acetate. The ethyl acetate is evaporated under vacuum and the residue is recrystallized from normal hexane. The recrystallized product is identified by NMR analysis as 430 mg. of 1-methyl-3-trifluoromethyl-Δ²-1,2,4-triazoline-5-one.

The method of Example 2 is used, with only minor alterations, to make other triazolin-5-one compounds such as the following.

1-ethyl-3-trifluoromethyl-Δ²-1,2,4-triazolin-5-one
3-difluoromethyl-1-methyl-Δ²-1,2,4-triazolin-5-one
3-difluoromethyl-1-isopropyl-Δ²-1,2,4-triazolin-5-one
1-methallyl-3-trifluoromethyl-Δ²-1,2,4-triazolin-5-one
1-cyclooctyl-3-(1,1,2,2-tetrafluoroethyl)-Δ²-1,2,4-triazolin-5-one The method of Example 3 below is an effective 1-step synthesis of 3-fluoroalkyl-triazolin-5-ones.

Example 3.—1-methyl-3-trifluoromethyl-Δ²-1,2,4-triazolin-5-one

A 2 g. portion of 1-trifluoroacetyl-2-methylsemicarbazide is fused in an oil bath at 160–180° C. for about 2 hours. After the gummy mixture has cooled, it is triturated with ethyl acetate, dissolving out the product.

The ethyl acetate solution is concentrated under vacuum, and the solid residue is triturated into benzene. The benzene solution is then chromatographed on 150 ml. of silica gel using mixtures of benzene and ethyl acetate. The fractions which are eluted with 10 percent ethyl acetate-90 percent benzene and 20 percent ethyl acetate-80 percent benzene are combined and recovered by evaporation of the solvents. Recrystallization of the product from benzenehexane produces 300 mg. of 1-methyl-3-trifluoromethyl-$\Delta^2$-1,2,4-triazolin-5-one.

The vinyl phosphate moiety of my compounds is added to the triazoline ring moiety in two steps. Examples 4 through 6 illustrate methods which are effective for the synthesis of all of the compounds within the scope of my invention.

Example 4.—Dimethyl[1-(1-methyl-5-thioxo-3-trifluoromethyl-$\Delta^2$-1,2,4-triazolin-4-yl)vinyl]phosphate A mixture of 940 mg. of 1-methyl-3-trifluoromethyl-$\Delta^2$-1,2,4-triazolin-5-thione, 1.0 g. of chloroacetic acid, and 75 ml. of methylene chloride is cooled to 0° C. To that mixture is added dropwise 1.2 g. of dicyclohexylcarbodiimide in 25 ml. of methylene chloride. The mixture is allowed to warm to room temperature and stirred overnight. The mixture is then cooled in ice and filtered to remove 1.3 g. of dicyclohexylurea.

To the filtrate is added dropwise 800 mg. of trimethyl phosphite in 25 ml. of methylene chloride. That mixture is stirred overnight. The reaction mixture is then heated to reflux for a short time, cooled, and extracted with 2 percent sodium carbonate solution. The organic layer is dried over anhydrous magnesium sulfate and evaporated under vacuum to isolate the crude oily product. That product is chromatographed on 250 ml. of silica gel using benzene-ethyl acetate as the eluant. The product-containing fractions are combined and evaporated under vacuum to produce 550 mg. of the product, which is identified by NMR as dimethyl [1-(1-methyl-5-thioxo-3-trifluoromethyl-$\Delta^2$-1,2,4-triazolin-4-yl)vinyl] phosphate.

Example 5.—[2,2-dichloro-1-(1-methyl-5-oxo-3-trifluoromethyl-$\Delta^2$-1,2,4-triazolin-4-yl)vinyl] diethyl phosphate To a mixture of 1.6 g. of 1-methyl-3-trifluoromethyl-$\Delta^2$-1,2,4-triazolin-5-one, 1.0 g. of triethylamine, and 200 ml. of ethyl ether is added 1.7 g. of trichloroacetyl chloride in 50 ml. of ethyl ether. The mixture is refluxed for 2 hours and then stirred at room temperature overnight. The mixture is filtered and the filtrate is immediately poured into a new flask. To this solution is added 1.3 g. of triethyl phosphite in ethyl ether and the mixture is stirred at room temperature for 2 days.

The solution is washed twice with 2 percent $Na_2CO_3$ solution and the organic layer is then dried over anhydrous magnesium sulfate. The dry organic solution is then evaporated under vacuum to remove the solvents and the product is chromatographed on 250 ml. of silica gel using benzene-ethyl acetate mixtures. The fractions which are found by TLC to contain product are combined and evaporated to produce 1.7 g. of product which is identified as [2,2 - dichloro - 1 - (1 - methyl - 5 - oxo-3-trifluoromethyl - $\Delta^2$ - 1,2,4 - triazolin - 4 - yl)vinyl] diethyl phosphate by NMR analysis.

Example 6.—Diethyl [1-(1-methyl-5-thioxo-3-trifluoromethyl-$\Delta^2$-1,2,4-triazolin-4-yl)propenyl] phosphate To a mixture of 5.5 g. of 1-methyl-3-trifluoromethyl-$\Delta^2$ - 1,2,4 - triazolin - 5 - thione and 5.3 g. of 2-chloropropionic acid in 100 ml. of tetrahydrofuran is added 6.2 g. of dicyclohexylcarbodiimide in 100 ml. of tetrahydrofuran. The mixture is stirred at room temperature for 3 days. Then the reaction mixture is filtered, and to the filtrate is added, dropwise, 5 g. of triethyl phosphite in tetrahydrofuran. That mixture is then stirred at room temperature overnight and then stirred at reflux temperature for 1 hour.

The volatiles are evaporated from the reaction mixture under vacuum, the residue is taken up in ethyl ether, and the ether solution is extracted twice with 2 percent sodium carbonate solution. The ether solution is then dried over anhydrous magnesium sulfate, the ether is evaporated under vacuum, and the residue is chromatographed on 250 ml. of silica gel with ethyl ether as the eluting solvent. The fractions which are found by TLC analysis to contain product are combined and evaporated to produce 3.8 g. of a product which is identified by NMR as diethyl [1 - (1 - methyl - 5 - thioxo - 3 - trifluoromethyl-$\Delta^2$-1,2,4-triazolin-4-yl)propenyl] phosphate The following compounds, exemplary of my novel phosphates, are conveniently synthesized by methods analogous to the methods of Examples 4 through 6.

[1-(1-allyl-5-thioxo-3-trifluoromethyl-$\Delta^2$-1,2,4-triazolin-4-yl)vinyl] dimethyl phosphate diethyl [1-(1-methyl-5-thioxo-3-trifluoromethyl-$\Delta^2$-1,2,4-triazolin-4-yl)propenyl] phosphate diethyl [1-(1-methyl-5-thioxo-3-trifluoromethyl-$\Delta^2$-1,2,4-triazolin-4-yl)vinyl] phosphate diethyl [1-(1-methyl-5-oxo-3-trifluoromethyl-$\Delta^2$-1,2,4-triazolin-4-yl)vinyl] phosphate

[2-chloro-1-(1-methyl-5-oxo-3-trifluoromethyl-$\Delta^2$-1,2,4-triazolin-4-yl)vinyl] diethyl phosphate

[1-(1-cyclobutyl-5-oxo-3-pentafluoroethyl-$\Delta^2$-1,2,4-triazolin-4-yl)propenyl] dipropyl phosphate

[1-(3-chlorodifluoromethyl-1-cyclohexyl-5-thioxo-$\Delta^2$-1,2,4-triazoloin-4-yl)-1-butenyl] dimethyl phosphate My new triazoline phosphates are useful for killing insects and acarids. The insecticidal and acaricidal data below shows that my compounds are effective in killing a large variety of species of harmful insects and acarids. The fraction of the contacted pests which will be killed depends on the hardiness of the species of insect and the amount of the compound which contacts them.

It is necessary that at least an effective amount of the pesticidal compound contact the pest to be killed. Effective amounts of pesticides are usually measured by the concentration of the active compound in the insecticidal or acaricidal composition. For example, for a given pest to be controlled, the effective amount might be 5 percent of active compound in a dust composition, or 100 p.p.m. of active compound in a water-dispersed composition. The determination of the effective amount for each pest is accomplished by merely applying different compositions to the pest or the locus of the pest and observing the result. Effective amounts will be found to fall within the ranges of from about 1 to about 1,000 p.p.m. of active compound in water-dispersed compositions, and between about 0.5 percent and about 10 percent of active compound in dust compositions.

These compounds are active, for example, against such acarids as red spider mite, citrus mite, two-spotted spider mite, Pacific mite, clover mite, fowl mite, various species of ticks, and various species of spiders. The compounds are also active against insects of the various orders including Mexican bean beetle, boil weevil, corn rootworms, cereal leaf beetle, flea beetles, borers, Colorado potato beetle, grain beetles, alfalfa weevil, carpet beetle, confused flour beetle, powder post beetle, wireworms, rice weevil, rose beetle, plum curculio, Japanese beetle, white grubs, melon aphid, rose aphid, white fly, grain aphid, corn leaf, leaf aphid, pea aphid, mealybugs, scales, leafhoppers, thrips, citrus aphid, spotted alfalfa aphid, green peach aphid, bean aphid, milkweed bug, tarnished plant bug, box elder bug, red bug, squash bug, chinch bug, ants, house fly, yellow fever mosquito, stable fly, horn fly, fleas, lice, cattle grubs, cabbage maggot, carrot rust fly, seed corn maggot, Southern armyworm, codling moth, cutworms, clothes moth, Indian meal moth, leafrollers, corn earworm, European corn borer, imported cabbage worm, cabbage looper, cotton bollworm, bagworm, sod webworm, tent caterpillar, fall armyworm, German cockroach, and American cockroach.

I have proved the insecticidal and acaricidal efficacy of my compounds by scientific tests. The tests to be reported here were conducted by dissolving the active phosphate compound in a water-miscible solvent, adding emulsifiers, and dispersing the solution in water in an amount to give the concentration which is shown below in each test. That insecticidal or acaricidal composition was then applied to the pest or to the locus of the pest against which the compound was to be tested.

For example, when a composition containing 100 p.p.m. of dimethyl [1 - (1 - methyl - 5 - thioxo-3-trifluoromethyl-$\Delta^2$ - 1,2,4 - triazolin - 4 - yl)vinyl] phosphate was applied to plants, and the plants were then infested with Mexican bean beetles, 90 percent of the beetles died. The same compound killed 90 percent of melon aphids allowed to feed on a plant which had been sprayed with 25 p.p.m. of the compound. When two-spotted spider mites were allowed to feed on a plant which had been sprayed with a 10 p.p.m. composition of the above compound, 90 percent of the mites were killed.

The same compound killed at least 90 percent of the exposed individual insects and acarids when Southern armyworms were contacted with a 250 p.p.m. composition, when milkweed bugs were contacted with a 500 p.p.m. composition, when house flies were contacted with a 100 p.p.m. composition, and when cotton boll weevils were contacted with a 1,000 p.p.m. composition.

The pesticides of my invention are useful for killing pests on plants. They are also useful for the control of pests in many other environments where those pests are harmful. For example, the compounds can be combined with inks, adhesives, soaps, polymers, cutting oils, and paints for the control of pests in those substances or on surfaces to which those substances may be applied. My compounds can be applied to textiles and to cellulose sheet materials, and can be employed in the impregnation of wood, lumber, and fibers. My compounds can also be effectively used to protect stored grain or seeds from pests.

A special insecticidal use for which my compounds are well suited is killing mosquito larvae. As is well known, mosquito larvae spend their entire pre-adult existence in water. In order to control the larvae, it is necessary to get the larvicidal compound in contact with the larvae through the water. My triazoline phosphates can be brought into contact with the larvae through the water by placing in the water any of the insecticidal compositions discussed below.

In order to control acarids and insects with my compounds, the compounds must be brought into contact with the pest. It is possible to contact the pest directly with the compound, or to deposit the compound on a locus which the pest infests. For example, a compound may be deposited on the pest's food, in water inhabited by the pest, on inert surfaces, on plants inhabited by the pest, or simply dispersed as an aerosol.

My compounds are brought into contact with the pest to be killed, or with the locus of the pest, in the form of insecticidal or acaricidal compositions which are formulated according to standard methods in the agricultural chemicals art. In order to make the best methods of use of my compounds clear, some explanation of the formulation of my insecticidal and acaricidal compositions will be given.

Insecticidal and acaricidal compositions comprise one of my active triazoline phosphates and at least one inert carrier. Inert carriers may be chosen from liquids, solids, and in the case of aerosol compositions, even from the gases.

Most often, my compounds are prepared in the form of concentrated formulations which are applied to the pest's habitat in the form of water dispersions or emulsions containing from about 1 to about 1,000 p.p.m. of the active compound. Water-dispersible or emulsifiable concentrations are either solids usually known as wettable powders, or liquids usually known as emulsifiable concentrates.

Pesticidal wettable powders comprise an intimate mixture of the active compound, an inert carrier, and surfactants. The concentration of the active compound is usually, for the sake of economy, reasonably high, such as from 10 percent to 90 percent. The inert carrier, comprising from about 5 to about 90 percent of the composition, is usually chosen from among the attapulgite clays, the montmorillonite clays, the diatomaceous earths, or in exceptional cases, from the purified silicates. Effective surfactants, which are usually used at the rate of from about 0.5 percent to about 10 percent, are usually chosen from among the sulfonated lignins, the condensed naphthalenesulfonates, the naphthalenesulfonates, the alkylbenzenesulfonates, the alkyl sulfates, and the nonionic surfactants such as ethylene oxide adducts of phenol.

Pesticidal emulsifiable concentrates of my phosphates usually comprise a convenient concentration of the active compound, such as from about one-half to about 4 pounds per gallon of liquid, dissolved in an inert carrier which is a mixture of water-immiscible organic solvent and emulsifiers. The organic solvent must of course be chosen with due regard to phytotoxicity, if the mixture is to be applied to plants, or to mammalian toxicity, and to cost. Useful organic solvents include the aromatics, especially the xylenes, and the petroleum fractions, especially mineral spirits and the high-boiling naphthalenic and olefinic portions of petroleum including heavy aromatic naphtha. Other organic solvents may also be used, such as the terpenic solvents including derivatives of pine rosin and such solvents of high solvent potency as tetrahydrofuran and dimethyl sulfoxide. Suitable emulsifiers for emulsifiable concentrates are chosen from the same types of surfactants used for wettable powders.

It may be desirable to add substances to a water dispersion or emulsion of one of my active compounds in order to assist the active compound in adhering to the substance to which it is applied. For example, water-dispersible gums, polybutene compounds, cationic surfactants, and water-dispersible polymers are effectively used, especially for application to plants. Such substances can be useful in maintaining the triazoline compounds in contact with the locus of the pests.

My compounds are also frequently applied to the habitat of pests in the form of dusts. The formulation of a pesticidal dust of one of my compounds usually requires no more sophisticated art than the intimate mixing of the finely ground pesticide with a finely ground, inexpensive, solid inert carrier. Widely-used insecticidal dust carriers include the kaolin clays, chalk, sulfur, pyrophyllite clays, montmorillonite clays, volcanic earths, and vegetable dusts such as ground walnut shell. Pesticidal dusts of my triazoline phosphates usually contain from 0.5 to about 5 percent of active compound, depending on the severity and the identity of the pest which is of primary concern. A stabilizer such as a glycol or an acid scavenger, such as epichlorohydrin, is necessary when dusts are to be made with active, highly sorptive clays.

When it is desired to suspend one of my compounds as an aerosol in order to contact airborne pests, the primary problem is to sufficiently atomize a solution of my compound. The most usual way to form pesticidal aerosols is to package the active compound in a pressurized package commonly known as an "aerosol bomb." Such products comprise a pressure-tight container filled with a solution of the active compound in an inert carrier which is a solvent mixed with propellants which are gases at normal ambient temperatures. The container is closed with an atomizing valve. The solvents and propellants must be chosen with due regard to their toxicity, since they are atomized along with the active compound.

Solvents for use in aerosol formulations are usually chosen from among the low molecular weight alcohols, the halogenated solvents especially methylene chloride, low molecular weight ketones such as acetone, and low molecular weight paraffins such as hexane. Propellants are chosen from among the hydrocarbon gases, especially propane and the butanes, the halocarbon gases such as carbon tetrafluoride, dichlorodifluoromethane, and 1,2-dichloro - 1,1,2,2 - tetrafluoroethane, and in exceptional cases from among inert gases such as compressed nitrogen or carbon dioxide. Aerosol formulations of my compounds usually contain very small concentrations of the active compound, such as from about 0.005 percent to about 1 percent.

When my compounds are to be used for the control of pests which inhabit water or the earth, it may be convenient to formulate the compound as a granule. Such granules typically comprise the pesticidal compound dispersed on a granular inert carrier which is usually coarsely ground clay. The particle size of agricultural pesticidal granules usually ranges from about 0.1 to about 3 mm. The usual formulation process comprises dissolving the phosphorus compound in an inexpensive solvent, such as kerosene or heavy aromatic naphtha, and applying the solution to the carrier in an appropriate solids mixer. Less economically, my pesticidal compound may be dispersed in a dough composed of damp clay or other inert carrier. The dough is then dried and coarsely ground to produce the desired granular product.

A particularly preferred method of forming granules of my novel compounds is known as marumerization and is accomplished in specific equipment which was disclosed in U.S. Pat. 3,579,719. The marumerization process comprises the dispersion of the active compound in a damp dough of an appropriate inert carrier, particularly clay such as attapulgite clay, kaolin clay, or diatomaceous earth, the extrusion of the pesticidal dough through a die containing small holes in the range of from about 0.2 mm. to about 3 mm., and the rolling the extrudate on a horizontal rotating plate. The plate rotates at the bottom of a vertical cylinder and is usually scored or roughened in order to increase the friction between the rotating plate and the extrudate. The rolling action of the particles of extrudate breaks the long particles into sections approximately as long as the extrudate is thick, rolls the broken particles against one another, and forms the particles into rounded elipsoidal or approximately spherical granules which have superior uniformity of particle size, freedom from dust, and flow characteristics.

Mixtures of pesticides, such as two or more insecticides or an insecticide and a fungicide, are often used to allow treatment of a habitat for control of several pests by one application. The use of my triazoline phosphates in such mixtures is feasible and is within the scope of my invention.

Compounds within the scope of my invention have useful biological activities other than their insecticidal and acaricidal activities. Some of my compounds are fungicides and herbicides. My fungicidal triazoline phosphates are useful for the control of fungi such as, for example, bean rust and anthracnose.

When my compounds are to be used for the control of crop-afflicting pathogens such as bacterial rust of beans, the compounds may be formulated and applied to the locus of the organism to be killed as compositions identical to my insecticidal and acaricidal compositions.

I claim:
1. A compound of the formula

$$\begin{array}{c} F \quad N\text{---}N\text{---}R^4 \\ | \quad \| \\ F\text{---}C\text{---}C \quad C=X \\ | \quad \diagdown \diagup \\ R^3 \quad N \quad O \quad O\text{---}R^5 \\ \diagdown \quad \| \diagup \\ C\text{---}O\text{---}P \\ \| \quad \diagdown \\ R^1\text{---}C\text{---}R^2 \quad O\text{---}R^5 \end{array}$$

wherein

X represents
 (A) oxygen, or
 (B) sulfur;
$R^1$ and $R^2$ independently represent
 (A) chloro,
 (B) bromo,
 (C) $C_1$–$C_2$ alkyl, or
 (D) hydrogen;
$R^3$ represents
 (A) hydrogen,
 (B) fluoro,
 (C) chloro,
 (D) trifluoromethyl, or
 (E) difluoromethyl;
$R^4$ represents
 (A) $C_1$–$C_4$ alkyl,
 (B) $C_3$–$C_8$ cycloalkyl, or
 (C) $C_3$–$C_4$ alkenyl;
$R^5$ represents $C_1$–$C_4$ alkyl.

2. The compound of claim 1, which is [2-chloro-1-(1-methyl-5-thioxo-3-trifluoromethyl - $\Delta^2$ - 1,2,4 - triazolin-4-yl)vinyl] diethyl phosphate.

3. The compound of claim 1 which is diethyl [1-(1-methyl-5-thioxo-3-trifluoromethyl - $\Delta^2$ - 1,2,4-triazolin-4-yl)vinyl] phosphate.

4. The compound of claim 1 which is diethyl [1-(1-methyl-5-thioxo-3-trifluoromethyl - $\Delta^2$ - 1,2,4,-triazolin-4-yl)propenyl] phosphate.

5. The compound of claim 1 which dimethyl [1-(1-methyl-5-thioxo-3-trifluoromethyl - $\Delta^2$ - 1,2,4,-triazolin-4-yl)-vinyl] phosphate.

6. The compound of claim 1 which is diethyl [1-(1-methyl-5-oxo-3-trifluoromethyl - $\Delta^2$ - 1,2,4-triazolin-4-yl)vinyl] phosphate.

References Cited
UNITED STATES PATENTS

| | | | |
|---|---|---|---|
| 3,594,390 | 7/1971 | Timmler et al. | 260—308 C |
| 3,719,686 | 3/1973 | Cebalo | 260—308 C |

FOREIGN PATENTS

| | | | |
|---|---|---|---|
| 4,018,747 | 8/1965 | Japan | 260—308 C |

ALTON D. ROLLINS, Primary Examiner

U.S. Cl. X.R.

260—552 SC; 424—200